US012617428B2

(12) United States Patent　　　　(10) Patent No.:　US 12,617,428 B2

Gallagher et al.　　　　　　　　　　　(45) Date of Patent:　　　May 5, 2026

(54) ACTION REFERENCE GENERATION PIPELINE

(71) Applicant: Zoox, Inc., Foster City, CA (US)

(72) Inventors: Liam Gallagher, San Francisco, CA (US); Matthew Van Heukelom, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 322 days.

(21) Appl. No.: 18/204,347

(22) Filed: May 31, 2023

(65) Prior Publication Data

US 2024/0400096 A1　　Dec. 5, 2024

(51) Int. Cl.
B60W 60/00　　　(2020.01)
B60W 30/09　　　(2012.01)
B60W 30/095　　　(2012.01)

(52) U.S. Cl.
CPC ........ B60W 60/0011 (2020.02); B60W 30/09 (2013.01); B60W 30/0956 (2013.01); B60W 2554/20 (2020.02); B60W 2554/80 (2020.02)

(58) Field of Classification Search
CPC ............. B60W 60/0011; B60W 30/09; B60W 30/0956; B60W 2554/20; B60W 2554/80; B60W 60/0027; B60W 60/0015
See application file for complete search history.

(56) References Cited

U.S. PATENT DOCUMENTS 9,568,915 B1 * 2/2017 Berntorp .............. G05D 1/0214
2022/0194419 A1 6/2022 Houshmand et al.

2023/0041975 A1　2/2023　Caldwell et al.
2023/0097121 A1　3/2023　Schwartz et al.
2024/0059285 A1 * 2/2024　Ng ........................ B60W 50/14

FOREIGN PATENT DOCUMENTS

EP　　　　2169500 A1　3/2010
JP　　2009281942 A　12/2009

OTHER PUBLICATIONS

C. Paxton, V. Raman, G. D. Hager and M. Kobilarov, "Combining neural networks and tree search for task and motion planning in challenging environments," 2017 IEEE/RSJ International Conference on Intelligent Robots and Systems (IROS), Vancouver, BC, Canada, 2017, pp. 6059-6066 (Year: 2017).*
Fulgenzi, Chiara, et al. "Probabilistic navigation in dynamic environment using rapidly-exploring random trees and gaussian processes." 2008 IEEE/RSJ International Conference on Intelligent Robots and Systems. IEEE, 2008. (Year: 2008).*
Search Report and Written Opinion for International Application No. PCT/US2024/029326, Dated Sep. 3, 2024, 12 pages.

* cited by examiner

*Primary Examiner* — Russell Frejd
*Assistant Examiner* — Ana D Thomas
(74) *Attorney, Agent, or Firm* — Lee & Hayes, P.C.

(57)　　　　　　　ABSTRACT

Techniques for accurately predicting and avoiding collisions with objects detected in an environment of a vehicle are discussed herein. A vehicle computing device can implement a model to generate action references usable in a tree search to control the vehicle. For example, the model may represent one or more trajectory generators that modify a baseline trajectory in different ways to output a set of actions trajectories that are usable to define a tree structure. The set of action trajectories can be used by the vehicle computing device for predicting vehicle actions by the vehicle computing device to control the vehicle.

20 Claims, 5 Drawing Sheets

ACTION REFERENCE GENERATION PIPELINE

BACKGROUND

Planning systems in autonomous and semi-autonomous vehicles determine actions for a vehicle to take in an operating environment. Actions for a vehicle may be determined based in part on avoiding objects present in the environment. For example, an action may be generated by a planning system to yield to a pedestrian, to change a lane to avoid another vehicle in the road, or the like. Accurately predicting future actions may be necessary to safely operate the vehicle in the vicinity of the object. The actions can be based on an output from a tree search.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
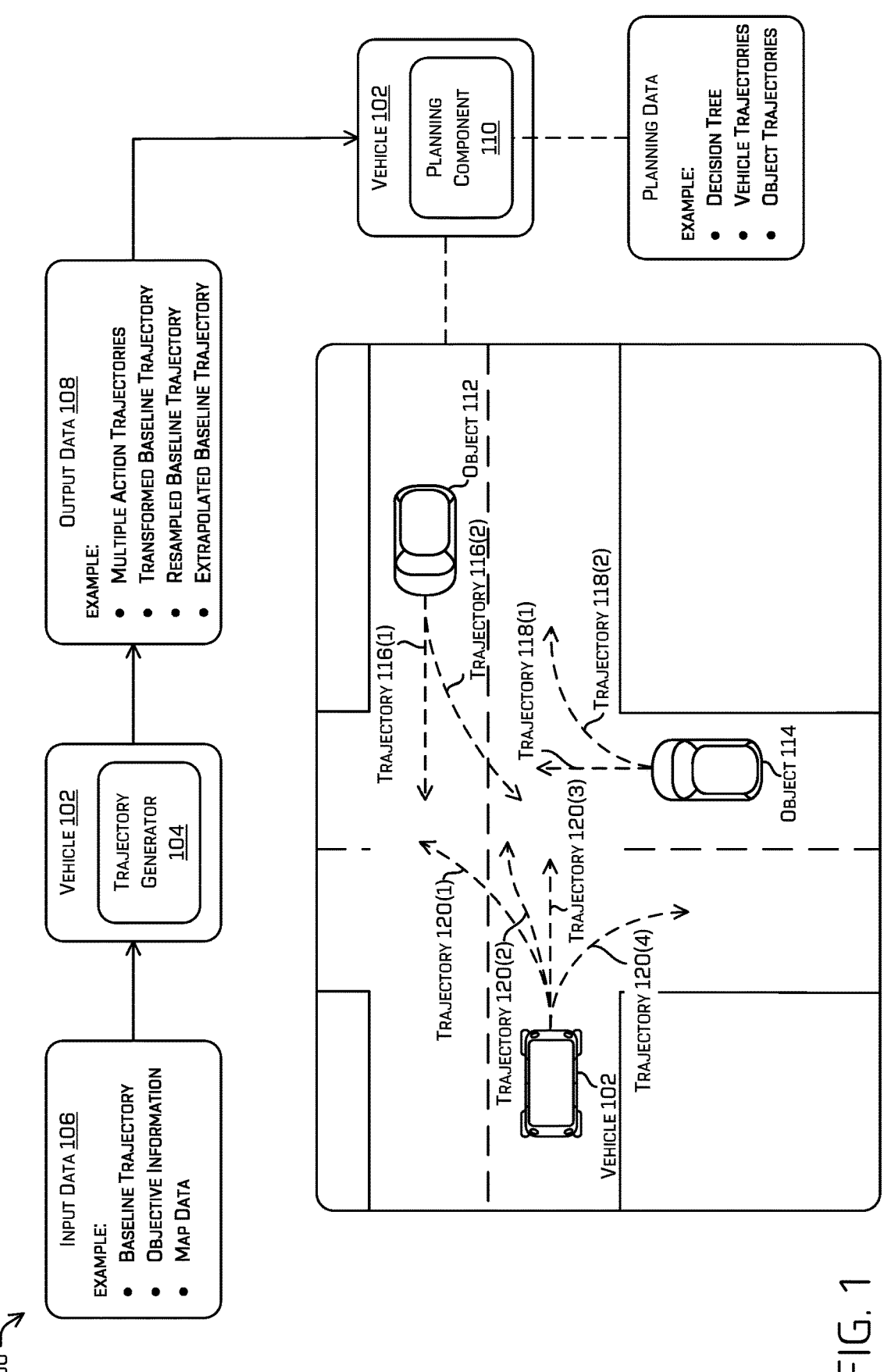
FIG. 1 is an illustration of an example environment, in which an example vehicle predicts trajectories usable to avoid a collision with one or more example objects.

Techniques for generating trajectories for controlling a vehicle are discussed herein. The techniques can include a vehicle computing device that implements a model to generate action references (e.g., reference trajectories) usable, for example, in a tree search to control the vehicle (though any other use of such trajectories is contemplated). For example, the model can represent one or more trajectory generators that modify a baseline trajectory in different ways and/or generate one or more alternative trajectories to output a set of actions that are usable to define a tree. The tree can, for example, include branches and/or nodes associated with one of the action trajectories in the set of action trajectories for the vehicle to track such that at any subsequent node the vehicle may switch which action reference is being tracked at that point in time. The vehicle computing device can use the tree to determine an action for the vehicle at a future time. By implementing the techniques described herein, a vehicle computing device can predict vehicle actions to control the vehicle with more accuracy and in less time, thereby improving the overall safety of the vehicle.

Generally, the model (e.g., a trajectory generator(s)) implemented by the vehicle computing device may provide functionality to determine multiple potential paths for a vehicle to avoid one or more objects in an environment in the future by modifying an input trajectory. In some examples, a single generator or multiple generators can be used to transform, resample, or otherwise modify the input trajectory. For instance, a first generator can generate an additional trajectory that is laterally offset from the input trajectory and a second generator can generate an additional trajectory that includes a scaled velocity relative to the input trajectory. Depending on the functionality performed, a generator can output a single trajectory that is a modified version of the input trajectory and/or a set of trajectories representing various modifications to the input trajectory.

In examples when multiple generators are implemented, the generators can be combined or chained together in a variety of different ways to output action references that represent spatial and temporal profiles through the environment. The generators can, for example, be combined in serial and/or in parallel (in any configuration) to generate a variety of trajectories. For example, a transform generator can output, generate, or otherwise determine actions trajectories having a starting point that is offset from a point associated with the input trajectory. A resample generator can, for example, change a number of points and/or a position of a point associated with the input trajectory to generate an output trajectory having a different sampling of points than the input trajectory. By combining the generators in a variety of ways, a variety of action trajectories are made available for consideration during planning operations by a vehicle computing device. The generators are described throughout this disclosure including in relation to FIGS. 2 and 3, and elsewhere.

As mentioned, output data from one or more the generators can be used to define a tree. For example, an output from any single generator and/or combination of generators can represent action trajectories which can be input to a tree search algorithm. In various examples, a same or different model can define a branch or a node (or other portion) of a tree to include or otherwise represent the output (e.g., a transformed trajectory, a resampled trajectory, and extrapolated trajectory, and so on).

As described herein, a trajectory can include one or more desired orientations (e.g., yaw, pitch, and/or roll), velocities, positions, accelerations, and/or any other vehicle state for the vehicle to navigate in an environment. In some examples, the trajectory can include points to represent a position of the vehicle at different times along the trajectory. Accordingly, the trajectory can represent temporal features and/or spatial features. In some examples, the trajectory can be based on state data such as one or more of: position data, orientation data, heading data, velocity data, speed data, acceleration data, yaw rate data, or turning rate data associated with a vehicle (e.g., an autonomous vehicle) or an object, just to name a few.

In some examples, the generators (also referred to herein as a component) may implement a parallel processing unit to determine an action trajectory (or points thereof). For example, a generator can receive a baseline trajectory as input and generate multiple action trajectories using the parallel processing unit. Additionally, or alternatively, multiple generators may perform various functions using the parallel processing unit to generate outputs that are combinable to represent a set of action trajectories.

In some examples, the generators may be chained sequentially such that an output from one generator serves as an input to another generator, and an output from the last generator can represent the set of action trajectories. An Application Program Interface (API) can control API calls that define an operation to be performed by a component.

Different combinations of generators can generate different sets of action trajectories usable with a tree search to provide a vehicle with a variety of potential paths to navigate in an environment. For instance, an action trajectory may be used to define a node or branch of the tree for consideration during a tree search used by a vehicle computing device during a planning operation. The vehicle computing device can control a vehicle (e.g., control steering, braking, acceleration, and so on) based at least in part on performing a tree search of the tree (input the action trajectory to a tree search algorithm).

In some examples, the generators may be chained in parallel such that the outputs by the generators are processed at substantially a same time, and the outputs from each generator may be combined to represent the set of action trajectories. For example, a model can implement a parallel processing unit to process input data to the generators in parallel to determine multiple outputs that are usable as action trajectories.

The vehicle computing device can implement one or more components to perform planning operations as described herein. For example, a prediction component can determine one or more predicted trajectories associated with an object(s) in an environment. In some examples, a planning component may determine a number of potential actions (e.g., reference trajectories) associated with the vehicle. An environment can be simulated and predicted trajectories of object(s) and/or possible actions can be updated or otherwise adjusted to account for the potential interactions of the object(s) and/or vehicle, which can provide for more accurate predictions and simulations of objects in an environment. In such examples, the prediction component and/or the planning component can receive data identifying the set of action trajectories for use in determining a potential action for the vehicle.

A baseline trajectory can represent a trajectory from a planning component, a teleoperator, or another source, and is associated with an intent (e.g., targets an objective). Accordingly, different baseline trajectories can be associated with different intents (e.g., enter or exit a parking space, change lanes, etc.) of a vehicle. In some examples, multiple baseline trajectories can be input into a generator(s) though in other examples a single baseline trajectory may be received as the input. In some examples, a storage device (e.g., memory, database, and the like) can store profile data identifying information about multiple baseline trajectories, and provide one or more baseline trajectories to a generator as input. For instance, the profile data can identify one or more of: a baseline trajectory identifier, one or more generators to implement with a particular baseline trajectory, a control policy, or a human-readable description for the profile, and the like.

In various examples, a set of action trajectories output by a generator can be trimmed, filtered, expanded, or otherwise modified based at least in part on a model applying a control policy to the set of action trajectories. For example, the model can determine a modified set of action trajectories based at least in part on results of simulating the set of action trajectories using the control policy (e.g., rules of the road, right of way logic, physics, kinematics, dynamics, and the like). In this way, trajectories that are not feasible for the vehicle to use in the future (e.g., based on kinematics, dynamics, etc.) may not be generated at all and/or can be removed from the set of action trajectories prior to use. The control policy may, in some example, be used to expand the set of action trajectories by increasing a length of an action trajectory, changing a stopping distance, and so on.

In some examples, the vehicle may comprise an autonomous or semi-autonomous vehicle with a vehicle computing device configured to receive sensor data from one or more sensors of the vehicle. The vehicle may detect objects using one or more sensors while navigating in the environment. The objects may include static objects (e.g., ground level, buildings, bridges, signs, etc.) and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle. As yet another example, the objects may be detected based on sensor data received from remote sensors, such as, for example, sensors associated with another vehicle or sensors situated in the environment that are configured to share data with a plurality of vehicles. Sensor data representing the detected objects may be used to determine input data usable by the model to predict an intersection probability associated with the object and/or one or more tracking trajectories.

In various examples, aspects of the processing operations may be parallelized and input to a parallel processor unit such as in parallel by a GPU and/or in parallel by multiple GPUs for efficient processing. Accordingly, implementing the techniques described herein can efficiently make use of available computational resources (e.g., memory and/or processor allocation or usage) while also improving accuracy of predictions.

In some examples, a model may define processing resources (e.g., processor amount, processor cycles, processor cores, processor location, processor type, and the like) to use to predict intersection probabilities associated with a potential intersection with the vehicle and/or the set of action trajectories (or points thereof). A vehicle computing device can implement a model that may have different processors (e.g., Central Processing Units (CPUs), Graphics Processing Units (GPUs), multi-core processor, and the like). Models may define processing resources to utilize a processor that most efficiently (e.g., uses the least amount of computational time) outputs a prediction. In some examples, a model may generate a set of action trajectories by processing data associated with the object and/or the vehicle using a GPU, CPU, or a combination thereof. In this way, the model may be defined to utilize the processing resources that enable the model to perform predictions in the least amount of time (e.g., to use the tracking trajectory in planning considerations of the vehicle). Accordingly, a model may make the best use of available processing resources and enable more predictions that may improve how a vehicle navigates in relation to the objects.

As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein can improve a functioning of a computing device of a vehicle in a number of ways. For example, the model may identify which objects to process in an environment to prevent unneeded actions by the vehicle, and/or improves predictions related to the behavior of the vehicle. In some examples, the model improves functioning and safety of the vehicle by preventing the vehicle from taking additional actions that are not required based on conditions in the environment around the vehicle. In addition, the techniques described herein can improve passenger comfort and/or vehicle safety such as, for example, avoiding sudden braking or swerving when not needed. The techniques can include the model optimizing available computational resources by performing operations that limit the impact on the available resources (as compared to not implementing the model). Utilizing output data from the model by a vehicle computing device, for instance, can improve the accuracy and/or reduce a latency for the vehicle to respond to a potential collision in the environment.

In various examples, implementing the model can improve safety of a vehicle by outputting one or more action trajectories for consideration during planning operations. For example, a candidate trajectory determined for the vehicle can be based at least in part on consideration of the action trajectories. By implementing the model, consideration to a set of action trajectories, and potential actions by each object and/or potential actions by the vehicle over time in a simulation, can be determined in substantially real-time before a safest possible route is determined for the vehicle to follow: In some examples, the techniques provide a greater number of action trajectories for consideration (e.g., via a tree search) than previously available, thereby ensuring that additional, and potentially safer, trajectories are available to the vehicle.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Additionally, the techniques described herein can be used with real data (e.g., captured using sensor(s)), simulated data (e.g., generated by a simulator), or any combination of the two.

FIG. 1 is an illustration of an example environment 100, in which an example vehicle predicts trajectories usable to avoid a collision with one or more example objects. For instance, an autonomous vehicle (vehicle 102) in the environment 100 can include an example prediction model (trajectory generator 104) that is configured to receive input data 106 and determine output data 108. A vehicle computing device (e.g., vehicle computing device 404) and/or a remote computing device (e.g., computing device(s) 436) may implement the trajectory generator 104 of the vehicle 102. While described as a separate system, in some examples, prediction techniques described herein may be implemented by other vehicle systems, components, and/or computing devices. For example, and as will be described in further detail with regard to FIG. 4, the intersection prediction techniques described herein may be implemented at least partially by or in association with a localization component 420, a perception component 422, a prediction component 424, and/or a planning component 426.

In some examples, the input data 106 can comprise one or more of: a baseline trajectory, objective information (e.g., an intent or other metadata associated with the baseline trajectory), a control policy, and/or map data, among others. For instance, the trajectory generator 104 can receive the input data 106 (e.g., one or more baseline trajectories), and generate the output data 108 comprising one or more action trajectories. An action trajectory can represent a transformed baseline trajectory, a resampled baseline trajectory, an extrapolated baseline trajectory, and/or other modification to the input data 106.

In various examples, a baseline trajectory can be associated with a trajectory type, such as turn left, turn right, follow; merge left, merge right, and so on. The baseline trajectory may be associated with a parking trajectory (e.g., a trajectory to park a vehicle), a trajectory from a planning component, an object trajectory from a prediction component, or other trajectory type. In some examples, the baseline trajectory can be generated from a machine learned model trained to output a "human-like" driving decision to simulate real-world driving scenarios. In any of the examples described in detail herein, multiple baseline trajectories of one or more such types may be provided to create a larger set of candidate trajectories for use by the vehicle (e.g., directly and/or by using a tree search).

The control policy can comprise one or more of: a physics policy, a dynamics policy, a kinematics policy, and/or a rules policy indicating how the vehicle and objects can potentially interact or indicating information about rules of the road such as a right of way associated with a roadway, an intersection, or a navigable surface. In some examples, the trajectory generator 104 can implement a model that accesses the control policy to determine actions, trajectories, positions, or other data associated with the vehicle and/or object(s). For instance, the control policy can be used by a model during a simulation performed by the computing device 202.

In various examples, the trajectory generator 104 can receive map data representing static features of the environment 100 (which, in at least some examples, may also comprise designations for lane markings, lane speed, road control information—e.g., stop signs, traffic signals, crosswalks, school zones, speed bumps, buildings, and the like). The map data can be received from one or more components of a vehicle computing device or remote computing device (e.g., a computing device associated with an autonomous vehicle in a fleet of vehicles or other computing device remote from the vehicle 102).

The trajectory generator 104 can, for example, represent a generative model that applies an algorithm(s) to transform, resample, extrapolate, and/or modify the input data 106. For instance, trajectory generator 104 can transform a baseline trajectory into multiple trajectories offset from a point along the baseline trajectory (e.g., additional trajectories laterally offset from an end or other point of the baseline trajectory). The trajectory generator 104 may also or instead resample points of the baseline trajectory to a change a number of points used to represent an action trajectory. Additionally, or alternatively, the trajectory generator 104 can extrapolate, extend, or relocate points of the baseline trajectory such that the action trajectory output by the model covers a greater length of time than the baseline trajectory. Another generator can add static features to an environment based on map data and output an action trajectory that represents the baseline trajectory avoiding the static object(s). Yet another generator may be used to add a vehicle action to an end of the baseline trajectory such as a stopping profile (e.g., different stopping actions can be added to the input data 106). Of course, other generators having different functionality may also be implemented depending on the example. Functionality associated with the trajectory generator 104 is discussed throughout this disclosure, including in FIGS. 2 and 3.

The trajectory generator 104 can determine the output data 108 by implementing generators in different combinations using computer-readable instructions that are determined based on a type of input data 106. For example, different types of baseline trajectories may use different generator combinations so that the output data 108 represents a variety of different potential trajectories for the vehicle to follow at a future time.

The instruction(s) can cause the generators to determine the output data 108 sequentially or simultaneously in a variety of ways. By combining the generators in different ways, the trajectory generator 104 can determine a set of action trajectories for consideration during planning operations by a vehicle computing device. For instance, a planning component 110 can receive the output data 108 and determine planning data representing potential vehicle trajectories and/or potential object trajectories usable to control the vehicle 102. The output data 108 can, for example, the incorporated into a tree structure usable by the planning component 110 to generate a vehicle trajectory as described herein.

In some examples, the trajectory generator 104 can determine the output data 108 while the vehicle 102 navigates in the environment 100. For example, the output data 108 may represent a future state(s) of the vehicle 102 and/or one or more objects for different times in the future as the vehicle 102 navigates to a destination in the environment 100. In various examples, the trajectory generator 104 can receive the input data 106 from one or more components of the vehicle computing device and/or computing device(s) remote from the vehicle 102 and may determine actions relative to the action trajectories associated with the output data 108.

In various examples, the vehicle computing device associated with the trajectory generator 104 (or another component such as the planning component 110) may be configured to receive sensor data representing object(s) of the environment 100, such as via a perception component (e.g., the perception component 422). In some examples, the vehicle computing device may detect, infer, estimate, or otherwise determine object state data representing characteristics of the object in the environment 100. For example, such object state data may comprise position, velocity, acceleration, size, semantic type, etc. In some examples, the sensor(s) may include sensors mounted on the vehicle 102, and may include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example, sensors mounted on another autonomous vehicle, and/or sensors mounted in the environment 100. In various examples, the vehicle 102 may be configured to transmit and/or receive data from other autonomous vehicles. The data may include sensor data and/or state data, such as sensor data associated with the environment 100.

In some examples, the vehicle computing device may be configured to detect an object in the environment 100, such as object 112 and object 114 (e.g., a vehicle), just to name a few: In some examples, the vehicle computing device may be configured to receive, detect, infer, estimate, or otherwise determine one or more trajectories (e.g., orientation, speed, acceleration, etc.) for the vehicle and each detected object. As shown in FIG. 1, the object 112 is associated with object trajectories 116(1) and 116(2), the object 114 is associated with object trajectories 118(1) and 118(2), and the vehicle 102 is associated with the vehicle trajectories 120(1), 120(2), 120(3), and 120(4) determined by the vehicle computing device (e.g., using the perception component 422, the prediction component 424, or another model). In some examples, the trajectory generator 104 may receive path information associated with the aforementioned object trajectories (e.g., 116(1), 116(2), 118(1), and 118(2)) from a machine learned model. Though FIG. 1 shows two trajectories associated with the various objects, any number of objects may be detected and any number of object trajectories may be predicted for each object.

In various examples, a tree search can be used to determine which of the available vehicle trajectories to employ at a particular time so that an action by the vehicle can be updated based on potential intersections. In at least some such examples, the output may indicate which of the set of trajectories to track to over subsequent points in time.

In some examples, the trajectory generator 104 may determine a vehicle state and/or an object state at different times in the future. The trajectory generator 104 may determine an action for the vehicle 112, the vehicle 114, and/or the vehicle 102 during simulation. For example, actions (e.g., a steering action, a braking action, an acceleration action, and so on) can be determined for a time period during a simulation (e.g., each second during a four second simulation). In various examples, the trajectory generator 104 may select, determine, or otherwise predict a vehicle trajectory that the vehicle 102 may use to navigate in the environment 100 relative to one or more paths (e.g., the object trajectories 116(1) and 116(2) associated with the vehicle 112). In various examples, the output data 108 can include a set of action trajectories for use during planning operations to cause the vehicle 102 to avoid the vehicle 112.

In some examples, the vehicle computing device may control the vehicle 102 in the environment based at least in part on the output data 108 (e.g., determine action trajectories to avoid the objects in the environment). For instance, the vehicle computing device may provide functionality to identify objects most likely to cause an intersection and communicate intersection information about the identified objects to other components of the vehicle computing device. Accordingly, potential intersections (e.g., a probability or likelihood of an intersection between object(s) and the vehicle) may be taken into account in operations (e.g., simulations, estimated states, interaction modeling, collision estimation, etc.) or other vehicle control planning operation (e.g., as determined by a planning component) to quickly and/or preemptively avoid objects, thereby improving safety of the vehicle. Additional detail for determining and utilizing the output data 108 are discussed throughout this disclosure. Additional details of performing simulations and/or generating trajectories are described in U.S. patent application Ser. No. 15/632,147, filed on Jun. 23, 2017, entitled "Trajectory Generation Using Temporal Logic and Tree Search," U.S. patent application Ser. No. 15/843,512, filed on Dec. 15, 2017, entitled "Trajectory Generation Using Curvature Segments," and U.S. patent application Ser. No. 15/632,147, filed on Jun. 23, 2017, entitled "Trajectory Prediction Based on a Decision Tree," which are incorporated herein by reference in their entirety and for all purposes.

The output data 108 from the trajectory generator 104 can be used by a vehicle computing device in a variety of ways. For instance, the trajectory generator 104 can generate a signal indicating information about the output data 108 (e.g., the action trajectories, tree information) for transmitting to a planning component (e.g., the planning component 110, planning component 426) of the vehicle computing device to control the vehicle 102 in the environment 100 (e.g., determine a vehicle trajectory and/or control a propulsion system, a braking system, or a steering system).

In various examples, one or more of: the vehicle trajectories 120(1), 120(2), 120(3), 120(4), and/or the object trajectories (e.g., the trajectories 116(1), 116(2), 118(1), and 118(2)) may represent a "corridor" as opposed to a line shown in FIG. 1. For example, any of the trajectories as described herein may represent an area of the environment 100 that may be occupied by the vehicle 102 and/or the objects 112 and 114 as the vehicle 102 traverses the environment 100.

A training component of a remote computing device, such as the training component 450 of the computing device(s) 436 and/or the vehicle computing device 404 may be implemented to train the trajectory generator 104. Training data may include a wide variety of data, such as image data, video data, lidar data, radar data, audio data, other sensor data, etc., that is associated with a known or desired value (e.g., a desired classification, inference, prediction, etc.). Such values may generally be referred to as a "ground truth." To illustrate, the training data may be used for image classification and, as such, may include an image of an environment that is captured by an autonomous vehicle and that is associated with one or more classifications. In some examples, such a classification may be based on user input (e.g., user input indicating that the image depicts a specific type of object) or may be based on the output of another machine learned model. In some examples, such labeled classifications (or more generally, the labeled output associated with training data) may be referred to as ground truth.

Figure 2:
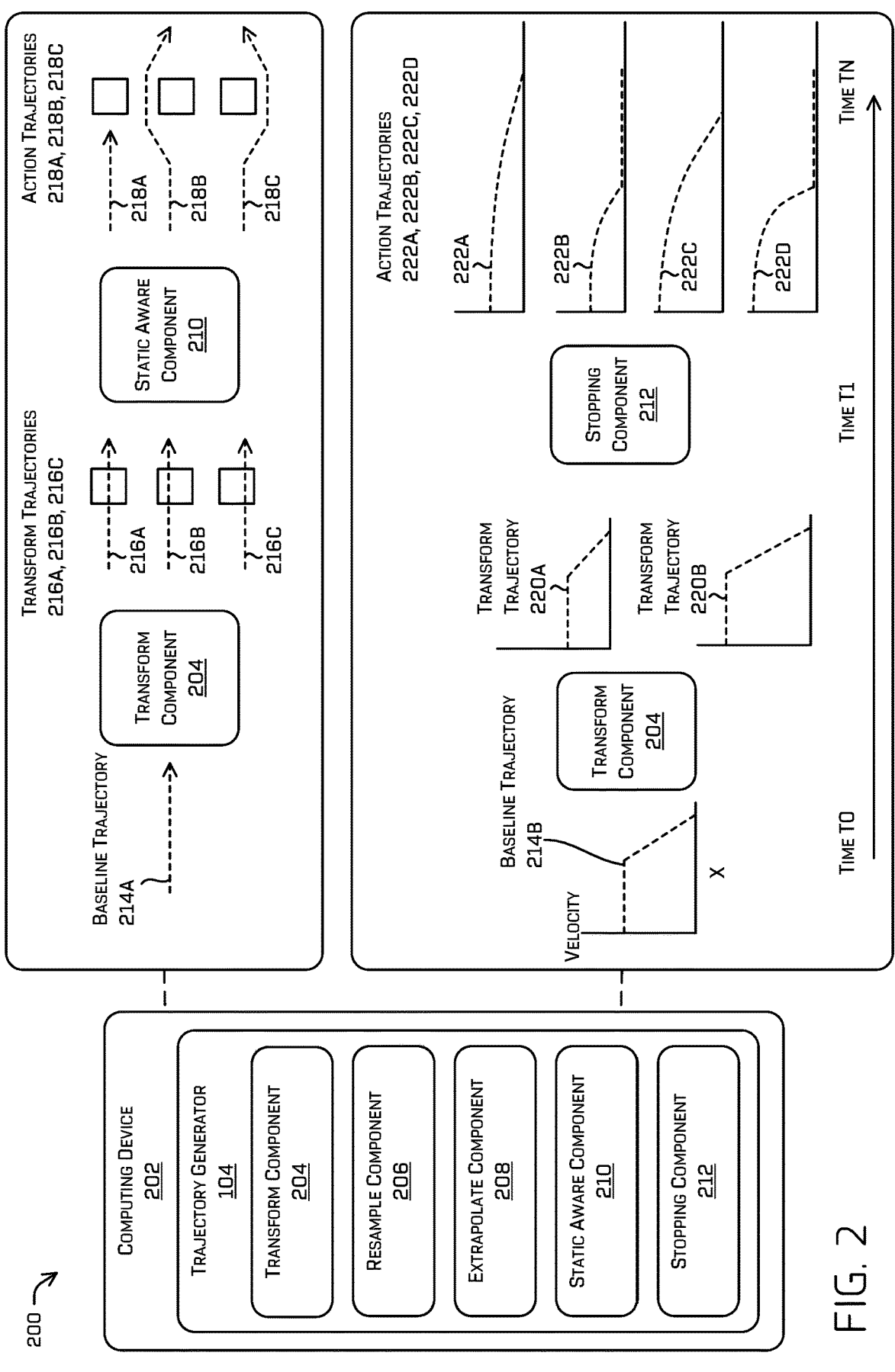
FIG. 2 is a block diagram of an example computing device implementing techniques to determine action trajectories for associating with a tree structure as described herein.

FIG. 2 is a block diagram 200 of an example computing device implementing techniques to determine action trajectories for associating with a tree structure as described herein. For instance, a computing device 202 can implement the trajectory generator 104 to determine the output data 108 representing action trajectories for use with a tree search algorithm that searches the action trajectories as potential trajectories for the vehicle 102 to follow at a future time. In some examples, a tree search can identify a vehicle trajectory to avoid potential interactions (e.g., intersections or near-intersections (e.g., within a threshold distance)) between one or more objects (e.g., the object 112 and/or the object 114) and the vehicle 102. In some examples, the computing device 202 may be associated with the vehicle computing device(s) 404 and/or the computing device(s) 436.

As shown in FIG. 2 the trajectory generator 104 comprises a transform component 204, a resample component 206, an extrapolate component 208, a static aware component 210, and a stopping component 212. Some components (e.g., the resample component 206, the extrapolate component 208, the static aware component 210, etc.) may output a number of action trajectories equal to a number of baseline trajectories received as input. However in other examples, the component (e.g., the transform component 204, the stopping component 212, etc.) may output more trajectories than the number of baseline trajectories received as input.

The transform component 204, the resample component 206, the extrapolate component 208, the static aware component 210, and/or the stopping component 212 may communicate or exchange data using an API. For instance, the trajectory generator 104 can receive an API call and route the API call to a component or generator.

In various examples, the trajectory generator 104 can employ one or more of the components to modify input data. For instance, FIG. 2 depicts a baseline trajectory 214A associated with a first example and a baseline trajectory

214B associated with a second example. However, in other examples any number of components may be implemented to generate action trajectories as described herein. Further, though illustrated using a single baseline trajectory as input (e.g., the baseline trajectory 214A or the baseline trajectory 214B), in other examples additional baseline trajectories may be processed by the trajectory generator 104 in a single example (e.g., by a parallel processor unit). As shown, the first example and the second example receive a single trajectory as input and generate multiple action trajectories as output.

The baseline trajectory 214B is shown relative to a coordinate system with the X axis representing length and a velocity axis, in the present example. Of course, the baseline trajectory 214A can also be associated with a coordinate system, which has been omitted for clarity. In other examples, the coordinate system may instead be associated with a three dimensional space.

In various examples, a baseline trajectory (e.g., the baseline trajectory 214A, etc.) can be associated with a trajectory type or region the trajectory will be used in (e.g., a region associated with a pick up/drop off area, a school zone, a highway, and the like). A baseline trajectory may differ from another baseline trajectory by an area of intended use or another attribute such as a length, arclength, just to name a few. The baseline trajectory can be associated with a trajectory type (e.g., follow, merge left, merge, right, turn left, turn right, though other types may also or instead be considered.

In some examples, a baseline trajectory can be associated with a lane reference or identifier such as whether the baseline is associated with a current lane (established), an adjacent lane, an adjacent but unusable lane, an oncoming lane, or an upcoming adjacent lane. Additionally, or alternatively, the baseline trajectory can be associated with a lane type as one or: drivable or non-drivable. A baseline trajectory may be used for filtering or identifying a parking lane for use during an emergency or for passenger pick-up/drop-off. In various examples, a type of baseline trajectory can be based at least in part on the lane reference and/or lane type.

The baseline trajectory can be, for example, monotonic in time and/or acceleration for ease of downstream processing, such as by the planning component 110 of FIG. 1. In other words, the baseline trajectory can include a constant acceleration and alike time intervals. In some examples, one or more baseline trajectories can be received by the trajectory generator 104 from a teleoperator (or model). The provided baseline trajectory can identify different velocity profiles for different portions of the baseline trajectory. For instance, a first section along the baseline trajectory can be associated with a first velocity for the vehicle to follow, and a second section can be associated with a second velocity for the vehicle, and so on.

The transform component 204 can output, generate, or otherwise determine a transform trajectory 216A, a transform trajectory 216B, and a transform trajectory 216C (collectively referred to as the transform trajectories 216). Generally, the transform component 204 can identify an operation to apply to input data, and in some examples apply a transformation. The transform trajectory 216A can, in some examples, be similar to the baseline trajectory 214A. The transform trajectory 216B and the transform trajectory 216C can each represent a trajectory that is offset laterally from a position associated with the baseline trajectory 214A. For example, objective information included as the input data can identify an offset distance, a number of trajectories to produce, or other information for transforming the input data. In some examples, the transform trajectories 216 can be generated up to a lane marker, a centerline, a roadway edge, or other area or region in an environment (e.g., a real-world environment or a simulated environment). As shown in FIG. 2, the transform component 204 can modify a lateral distance associated with one or more points along the baseline trajectory to generate one or more points associated with the transform trajectory 216B and/or the transform trajectory 216C.

In various examples, the transform component 204 can modify a position and/or any other variable associated with a state associated with an input trajectory. For example, a vehicle state (e.g. a velocity) can be scaled across points of the baseline trajectory 214A to generate the transformed trajectories 216 (e.g., points having 80% of the velocity associated with the baseline trajectory).

In some examples, the transform trajectories 216 can represent action trajectories for associating with a tree structure or for inputting to a tree search algorithm. For example, the transform component 204 can be used to generate action trajectories without requiring processing by an additional component.

As shown, the transform trajectories 216 can be input into the static aware component 210 for determining an action trajectory 218A, an action trajectory 218B, and an action trajectory 218C (collectively referred to as the action trajectories 218). The static aware component 210 can represent functionality to modify the transform trajectories 216 based at least in part on a simulated presence of a static object. For instance, the action trajectory 218A represents a trajectory for the vehicle 102 usable to stop prior to a static object shown as a box. The box is also shown relative to the transform trajectories 216 to show a relative position of a respective trajectory. The action trajectory 218B and the action trajectory 218C represent trajectories for the vehicle to use to avoid the static object. The action trajectories 218 in the illustrated example can also be thought of as a transformed, static aware trajectory.

The action trajectories 218 can be associated with a time period into the future such as that each point along a respective action trajectory is another point in time. In some examples, the time period for an action trajectory is equal to a time period associated with the baseline trajectory 214A, though a length, velocity, or other vehicle state may differ between the action trajectory and the baseline trajectory. Thus, while the length of an action trajectory can vary from a corresponding baseline trajectory, an output from the static aware component 210 can cover a same time period into the future while another component (e.g., the stopping component 212) can generate an output associated with a different time period. For instance, some modifications to the input data can result in trajectories having a longer time period in the future than the input data. In examples with multiple baseline trajectories as input data, each baseline trajectory can include a same or different time period as another baseline trajectory.

In some examples, the action trajectories 218 can be associated with a portion of a tree structure (e.g., a node, a branch, etc.) and/or input to a tree search algorithm. However, in other examples the output from the static aware component 210 may be input into another component for determining an output for associating with the tree structure. Further, the order of the processing by a component can vary to produce different results.

The resample component 206 can, for example, represent functionality for adding or removing a point along an input trajectory and/or modifying a position of the point(s) to generate an output trajectory having a different sampling of points than the input trajectory. For instance, the resample component 206 can modify a sample point position and/or a frequency of points along the input trajectory. The input trajectory (e.g., one or more baseline trajectories) can be associated with points defining a line, curve, or other shape, which can be thought of as a sampling of points. The resample component 206 can, for instance, modify a sampling of the points of the input trajectory to provide a same number of control points associated with the output trajectories as a number of control points associated with the input trajectories and/or any other desired number of control points.

The extrapolate component 208 can, for example, represent functionality for adding points to an end of the input trajectory (e.g., extending a baseline trajectory from a first end or a second end of the input trajectory). Additionally, or alternatively, the extrapolate component 208 can move one or more points of the input trajectory to extend a time period associated with an output from the extrapolate component 208. In some examples, an extrapolated trajectory can include a new trajectory extended from an end of the input trajectory. In various examples, the extrapolate component 208 can change a shape an input trajectory while retaining a same start position to generate a trajectory that "covers" a different temporal space than the timeframe associated with the input trajectory. An example including the extrapolate component 208 and the resample component 206 is discussed in relation to FIG. 3, and elsewhere.

As mentioned, the static aware component 210 can receive an input trajectory (ies) (e.g., a baseline trajectory, a trajectory output by another component of the computing device 202) for modifying relative to one or more static objects (e.g., ground level, a building, a bridge, a sign, a traffic light, vegetation, and the like). In various examples, the static aware component 210 can determine presence of a static object(s) in a path of the input trajectory (ies), and generate a trajectory to avoid the static object(s). For instance, at least a portion of the input trajectory can be altered to brake for the static object (e.g., the action trajectory 218A) and/or to go around the static object (e.g., the action trajectory 218A and the action trajectory 218B). In some examples, the static aware component 210 can receive input data from the transform component 204 (or a baseline trajectory), and provide output data to another component for processing (e.g., serve as an intermediary between components). The static aware component 210 can assign or determine a static object relative to a trajectory received as input, and cause the trajectory to be altered to avoid the static object.

As illustrated in FIG. 2, the trajectory generator 104 can sequentially predict output data at times T0, T1, . . . TN (where N is an integer greater than 1) using different components to generator, modify, or otherwise determine action trajectories. For example, the baseline trajectory 214B can be processed by the transform component 204 and the stopping component 212, though other numbers and/or combinations of components may be used. As shown, the baseline trajectory 214B represents a constant velocity that begins to change over time although in other examples a variety of other shapes may be represented. FIG. 2 shows the baseline trajectory 214B with velocity on a first axis, and X to represent length or another variable on a second axis. The transform component 204 outputs a transform trajectory 220A and a transform trajectory 220B, each having a different shape from the baseline trajectory 214B. For instance, the transform trajectory 220A can include a same number of points as the baseline trajectory 214B with at least some of the points repositioned to modify a shape of the baseline trajectory 214B. As shown, the transform trajectory 220A and the transform trajectory 220B are input to the stopping component 212.

The stopping component 212 can, for example, represent functionality for determining a stopping trajectory based at least in part on an input trajectory. For example, the stopping component 212 can receive a baseline trajectory and/or a trajectory from another component and identify a stopping action to cause a vehicle to safely stop (with consideration to passenger safety and comfort). In some examples, the stopping component 212 can output stopping trajectories for further processing by another component while in other examples, such as FIG. 2, the output represents an action trajectory 222A, an action trajectory 222B, an action trajectory 222C, and an action trajectory 222D (collectively referred to as the action trajectories 222). The action trajectory 222B can represent a stopping action associated with a higher braking force than the action trajectory 222A, for example. In some examples, the action trajectories 222 can represent different deceleration profiles and may continue until the vehicle reaches zero velocity. In various examples, the stopping component 212 can cause a new velocity profile to be applied to any point along the transform trajectory 220A and/or the transform trajectory 220B.

In various examples, the action trajectories 222 can be transmitted to a vehicle computing device for further processing (e.g., to associate with a tree search configured to determine a vehicle trajectory). In some examples, the vehicle computing device can simulate possible actions for the vehicle and/or objects over time using the tree search. For instance, if a vehicle takes a first action at a first time, such as 100 milliseconds (ms) into the simulation, the vehicle computing device can determine a second action for the vehicle based on the first action taken by the vehicle. In this way, the vehicle computing device can provide functionality to consider possible actions at each instance of the simulation (e.g., over 4 seconds). In some examples, the vehicle computing device can determine actions for both the vehicle 102 and one or more objects in the environment (e.g., the object 112 and the object 114) that are dependent upon previous actions as time increases during the simulation.

In various examples, the computing device 202 can implement a tree search that comprises branches corresponding to action trajectories. For instance, the computing device 202 can implement a tree search having branches corresponding to different vehicle trajectories (e.g., the action trajectories 218 and/or the action trajectories 222), and a search of the tree structure can occur every 100 ms (or other interval) identifying one of the vehicle trajectories that is safest for operation in the environment.

In some examples, a tree search can determine potential interactions between object trajectories of different objects and/or object trajectories and vehicle trajectories, and the potential interactions determined by the tree search can be used in a simulation. In various examples, the tree search can identify potential interactions over time to reduce a number of potential interactions for a later time (e.g., at each second or other time interval the tree search can determine a most likely interaction between object(s) and the vehicle). In some examples, vehicle actions (e.g., action trajectories) can be explored as various branches of a tree search and tree branches can be pruned or ignored if a cost associated with an action meets or exceeds a threshold cost. As a non-limiting example, one or more actions may be contemplated at discrete steps in the future (e.g., at fixed time, distance intervals, or some other event-based step). In such an example, the tree may branch at such discrete points based on differing actions that the vehicle could take at those points and the methods described herein may be used in selecting between those branches when expanding the tree. For instance, branches may be explored having the lowest cost and/or in which there is no adverse event (e.g., collision, uncomfortable control, etc.).

The trajectory generator 104 can comprise a memory allocation component (not shown) to allocate the input data associated with one or more components in one or more memories of the computing device 202. In various examples, allocating or assigning data in memory comprises the memory allocation component determining a location or portion of the memory for efficient processing of the input data. In this way, a processor (e.g., one or more GPUs) of the computing device 202 can efficiently process the input data during generation of the output data. In some examples, the memory allocation component allocates the input data to a parallel processor unit (e.g., a CPU, GPU, or the like capable of processing input data at substantially a same time). For example, the trajectory generator 104 can process multiple baseline trajectories as input substantially simultaneously. In some examples, output from one or more components (e.g., the transform component 204, the resample component 206, etc.) can be determined in parallel using a parallel processor unit.

Figure 3:
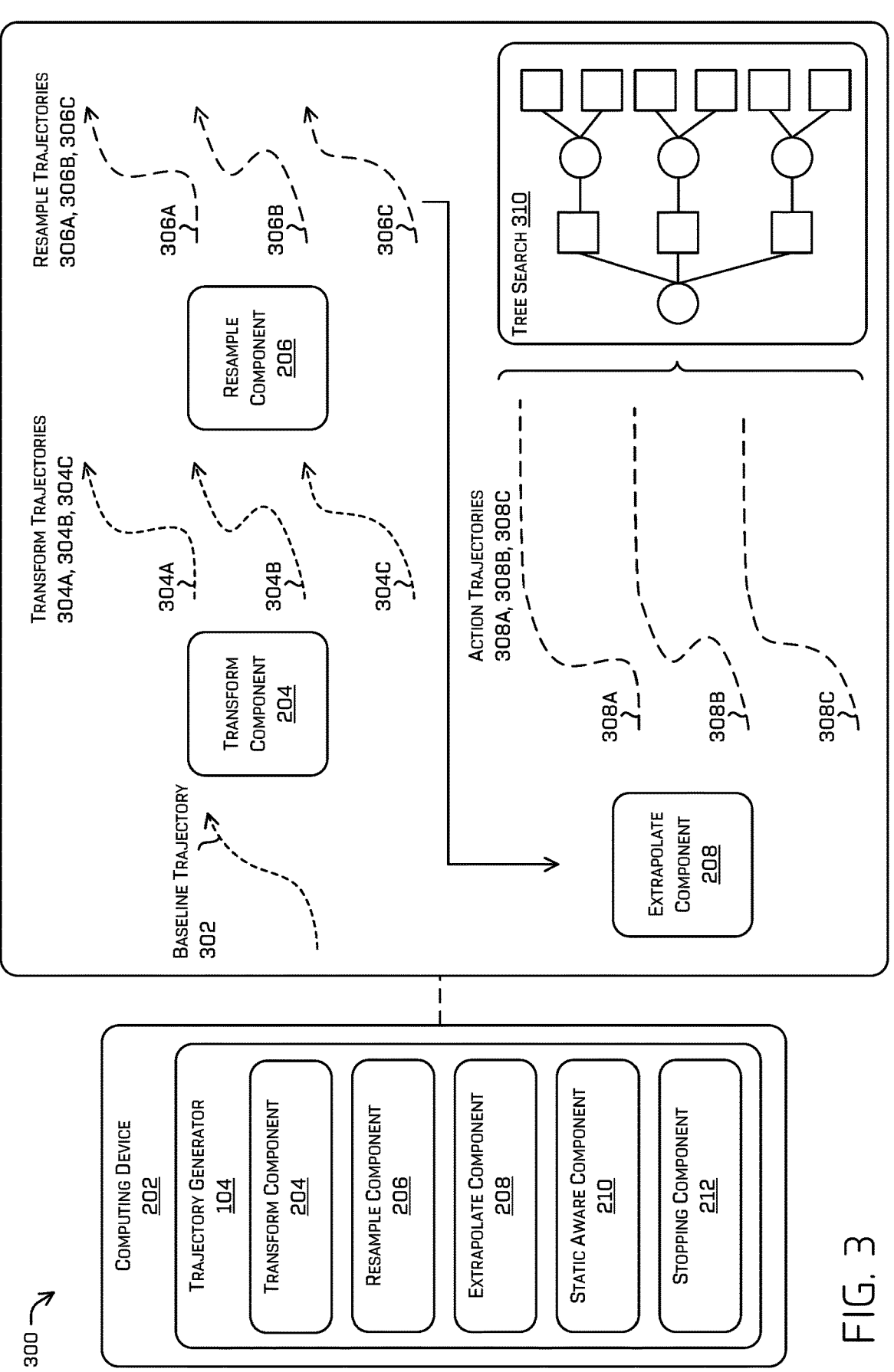
FIG. 3 is another block diagram of an example computing device implementing techniques to determine action trajectories for associating with a tree structure as described herein.

FIG. 3 is a block diagram 300 of an example computing device implementing techniques to determine action trajectories for associating with a tree structure. For instance, a computing device 202 can implement the trajectory generator 104 to determine the output data 108 representing action trajectories for use with a tree search algorithm that searches the action trajectories as potential trajectories for the vehicle 102 to follow at a future time. In some examples, a tree search can identify a vehicle trajectory to avoid potential interactions (e.g., intersections or near-intersections (e.g., within a threshold distance)) between one or more objects (e.g., the object 112, the object 114, and/or the object 114) and the vehicle 102. In some examples, the computing device 202 may be associated with the vehicle computing device(s) 404 and/or the computing device(s) 436.

FIG. 3 depicts the transform component 204 receiving a baseline trajectory 302 and outputting a transform trajectory 304A, a transform trajectory 304B, and a transform trajectory 304C (collectively referred to as the transform trajectories 304). For example, the transform trajectories 304 can represent a variety of modifications to the baseline trajectory 302 including repositioning of points defining the baseline trajectory 302.

By way of example and not limitation, the transform component 204 may determine the transform trajectories 304 by determining an offset distance from one or more points along the baseline trajectory 302. Points defining one of the transform trajectories 304 can be determined by the transform component 204 based on input data identifying predetermined values identifying an amount to scale a particular point and/or a number of points to reposition. In some examples, the predetermined values can be determined based on input from a model and/or an administrator (a human) to cause a different number of action trajectories to be determined with a variety of shapes.

The resample component 206 can, in some examples, receive the transform trajectories 304 and apply one or more algorithms to output a resample trajectory 306A, a resample trajectory 306B, and a resample trajectory 306C (collectively referred to as the resample trajectories 306). The resample trajectory 306A can have a same or different shape as the transform trajectory 304A. For example, the resample component 206 can modify a number of points and/or a position of a point along the transform trajectories 304 to generate the resample trajectories 306.

The block diagram 300 further depicts the extrapolate component 208 receiving the resample trajectories 306 from the resample component 206, and outputting an action trajectory 308A, an action trajectory 308B, and an action trajectory 308C (collectively referred to as the action trajectories 308). The extrapolate component 208 can, for example, modify each of the resample trajectories 306 by generating an additional trajectory portion to an end of the corresponding resample trajectory. In some examples, the extrapolate component 208 can add the additional trajectory portion to extend a length along a trajectory received as input, and to cover additional times in the future.

In various examples, a tree search 310 may be performed by the trajectory generator 104 using the action trajectories 308. The tree search 310 can include node branches, edges, or the like, of a tree structure which can be associated with the action trajectories 308. The tree search 310 may be performed using a tree structure which generates outputs at different time intervals as described herein. By associating the action trajectories 308 with the tree search 310, the computing device 202 may perform a variety of simulations between a vehicle and one or more objects with consideration to one or more of the action trajectories 308 (or a vehicle trajectory determined therefrom).

In some examples, the trajectory generator 104 (or component thereof) can determine output data based at least in part on the vehicle state data such as a position, a velocity, an acceleration, etc. of the vehicle 102. In various examples, the trajectory generator 104 can determine the action trajectories based at least in part on the vehicle state data. For instance, based on the velocity of vehicle 102, the trajectory generator 104 can determine a feasible trajectory for the vehicle 102 to follow in an environment. In some examples, dynamics and/or kinematics of the vehicle 102 can be considered by the trajectory generator 104 when determining the transform trajectories 216, the action trajectories 218, the action trajectories 222, etc. However, in other examples data output by the trajectory generator 104 need not be based on state data or necessarily be feasible dynamically.

While described as a separate system, in some examples, techniques to evaluate trajectories described herein in relation to FIGS. 1-3 may be implemented by other vehicle systems, components, and/or computing devices. For example, and as will be described in further detail with regard to FIG. 4, the prediction techniques described herein in relation to FIGS. 1-3 may be implemented at least partially by or in association with a perception component, a planning component, and/or a model component of FIG. 4.

Figure 4:
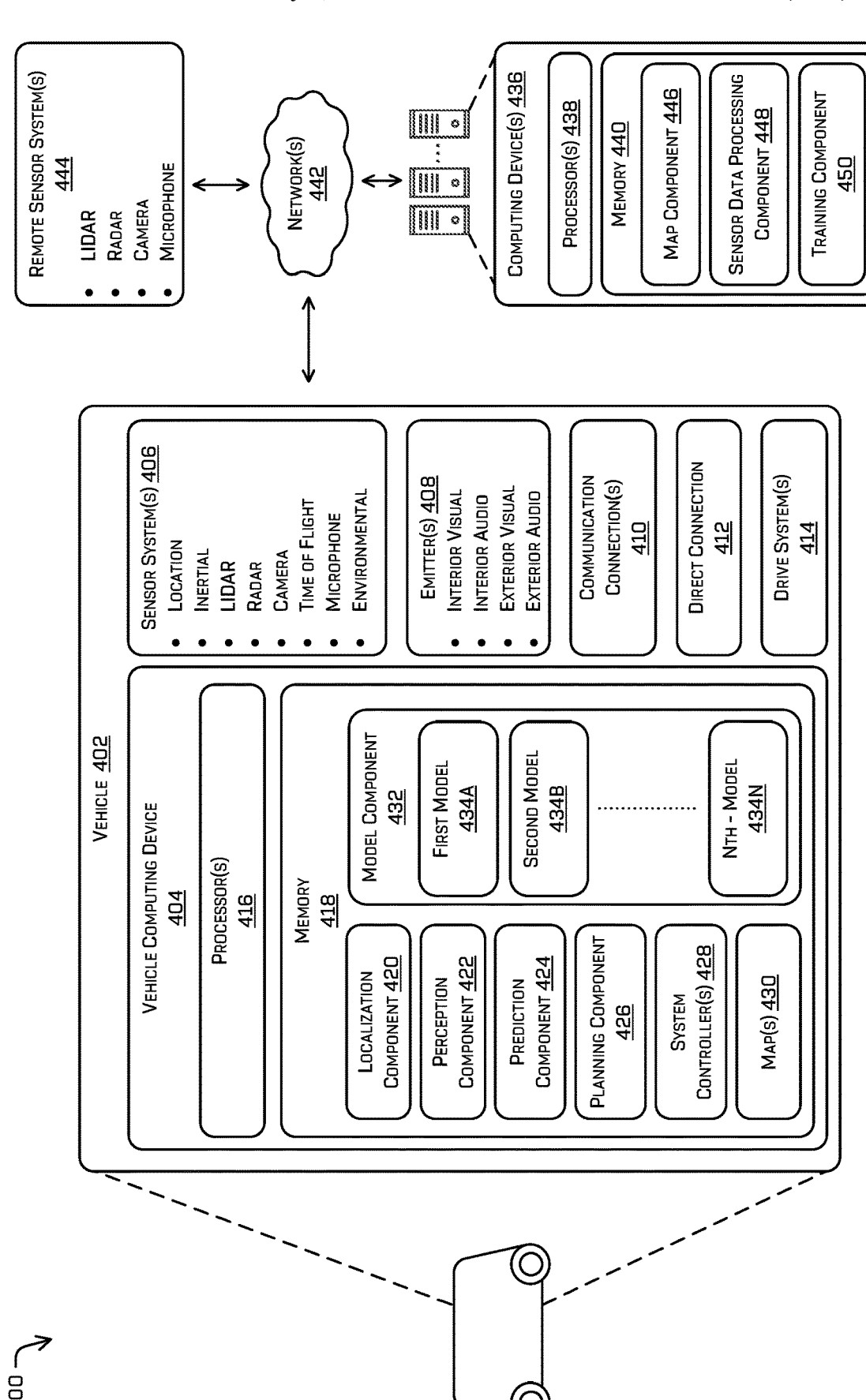
FIG. 4 is a block diagram of an example system for implementing the techniques described herein.

FIG. 4 is a block diagram of an example system 400 for implementing the techniques described herein. In at least one example, the system 400 may include a vehicle, such as vehicle 402.

The vehicle 402 may include a vehicle computing device 404, one or more sensor systems 406, one or more emitters 408, one or more communication connections 410, at least one direct connection 412, and one or more drive system(s) 414.

The vehicle computing device 404 may include one or more processors 416 and memory 418 communicatively coupled with the one or more processors 416. In the illustrated example, the vehicle 402 is an autonomous vehicle;

however, the vehicle 402 could be any other type of vehicle, such as a semi-autonomous vehicle, or any other system having at least an image capture device (e.g., a camera enabled smartphone). In some instances, the autonomous vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 402 may be a fully or partially autonomous vehicle having any other level or classification.

In various examples, the vehicle computing device 404 may store sensor data associated with actual location of an object at the end of the set of estimated states (e.g., end of the period of time) and may use this data as training data to train one or more models. In some examples, the vehicle computing device 404 may provide the data to a remote computing device (i.e., computing device separate from vehicle computing device such as the computing device(s) 436) for data analysis. In such examples, the remote computing device(s) may analyze the sensor data to determine an actual location, velocity, direction of travel, or the like of the object at the end of the set of estimated states.

In the illustrated example, the memory 418 of the vehicle computing device 404 stores a localization component 420, a perception component 422, a prediction component 424, a planning component 426, one or more system controllers 428, one or more maps 430, and a model component 432 including one or more model(s), such as a first model 434A, a second model 434B, up to an Nth model 434N (collectively "models 434"), where N is an integer. Though depicted in FIG. 4 as residing in the memory 418 for illustrative purposes, it is contemplated that the localization component 420, the perception component 422, the prediction component 424, the planning component 426, one or more system controllers 428, one or more maps 430, and/or the model component 432 including the model(s) 434 may additionally, or alternatively, be accessible to the vehicle 402 (e.g., stored on, or otherwise accessible by, memory remote from the vehicle 402, such as, for example, on memory 440 of a remote computing device 436).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 430 and/or map component 446, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 424 can generate one or more probability maps representing prediction probabilities of possible locations of one or more objects in an environment. For example, the prediction component 424 can generate one or more probability maps for vehicles, pedestrians, animals, and the like within a threshold distance from the vehicle 402. In some instances, the prediction component 424 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 424 may generate predicted trajectories of objects (e.g., objects) in an environment and/or to generate predicted candidate trajectories for the vehicle 402. For example, the prediction component 424 may generate one or more predicted trajectories for objects within a threshold distance from the vehicle 402. In some examples, the prediction component 424 may measure a trace of an object and generate a trajectory for the object based on observed and predicted behavior.

In general, the planning component 426 may determine a path for the vehicle 402 to follow to traverse through an environment. For example, the planning component 426 may determine various routes and trajectories and various levels of detail. For example, the planning component 426 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 426 may generate an instruction for guiding the autonomous vehicle along at least a portion of the route from the first location to the second location. In at least one example, the planning component 426 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 426 can select a trajectory for the vehicle 402 based at least in part on receiving data representing an output of the model component 432 and/or otherwise determine a desired set of trajectories by using a tree search with various input trajectories, as discussed herein.

In other examples, the planning component 426 can alternatively, or additionally, use data from the localization component 420, the perception component 422, and/or the prediction component 424 to determine a path for the vehicle 402 to follow to traverse through an environment. For example, the planning component 426 can receive data from the localization component 420, the perception component 422, and/or the prediction component 424 regarding objects associated with an environment. Using this data, the planning component 426 can determine a route to travel from a first location (e.g., a current location) to a second location (e.g., a target location) to avoid objects in an environment. In at least some examples, such a planning component 426 may determine there is no such collision free path and, in turn, provide a path which brings vehicle 402 to a safe stop avoiding all collisions and/or otherwise mitigating damage. Additionally or alternatively, the planning component 426 can determine the path for the vehicle 402 to follow based at least in part on data received from the trajectory generator 104 described in FIGS. 1-3 and elsewhere.

In at least one example, the vehicle computing device 404 may include one or more system controllers 428, which may be configured to control steering, propulsion, braking, safety, emitters, communication, and other systems of the vehicle 402. The system controller(s) 428 may communicate with and/or control corresponding systems of the drive system(s) 414 and/or other components of the vehicle 402.

The memory 418 may further include one or more maps 430 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 430. That is, the map(s) 430 may be used in connection with the localization component 420, the perception component 422, the prediction component 424, and/or the planning component 426 to determine a location of the vehicle 402, detect objects in an environment, generate routes, determine actions and/or trajectories to navigate within an environment.

In some examples, the one or more maps 430 may be stored on a remote computing device(s) (such as the computing device(s) 436) accessible via network(s) 442. In some examples, multiple maps 430 may be stored based on, for example, a characteristic (e.g., type of entity, time of day, day of week, season of the year, etc.). Storing multiple maps 430 may have similar memory requirements, but increase the speed at which data in a map may be accessed.

As illustrated in FIG. 4, the vehicle computing device 404 may include a model component 432. The model component 432 may be configured to perform the functionality of the trajectory generator 104, including determining one or more action trajectories, such as the action trajectories 218 and 220 of FIG. 2 and the action trajectories 308 of FIG. 3. In various examples, the model component 432 may receive one or more features associated with the detected object(s) from the perception component 422 and/or from the sensor system(s) 406. In some examples, the model component 432 may receive environment characteristics (e.g., environmental factors, etc.) and/or weather characteristics (e.g., weather factors such as snow, rain, ice, etc.) from the perception component 422 and/or the sensor system(s) 406. While shown separately in FIG. 4, the model component 432 could be part of the prediction component 424, the planning component 426, or other component(s) of the vehicle 402.

In various examples, the model component 432 may send predictions from the one or more models 434 that may be used by the prediction component 424 and/or the planning component 426 to generate one or more predicted trajectories of the object (e.g., direction of travel, speed, etc.) and/or one or more predicted trajectories of the object (e.g., direction of travel, speed, etc.), such as from the prediction component thereof. In some examples, the planning component 426 may determine one or more actions (e.g., reference actions and/or sub-actions) for the vehicle 402, such as vehicle candidate trajectories. In some examples, the model component 432 may be configured to determine whether an object intersects at an intersection point based at least in part on the one or more actions for the vehicle 402. In some examples, the model component 432 may be configured to determine the actions that are applicable to the environment, such as based on environment characteristics, weather characteristics, or the like.

The model component 432 may generate sets of estimated states of the vehicle and one or more detected objects forward in the environment over a time period. The model component 432 may generate a set of estimated states for each action (e.g., reference action and/or sub-action) determined to be applicable to the environment. The sets of estimated states may include one or more estimated states, each estimated state including an estimated position of the vehicle and an estimated position of a detected object(s). In some examples, the estimated states may include estimated positions of the detected objects at an initial time (T=0) (e.g., current time).

The estimated positions may be determined based on a detected trajectory and/or predicted trajectories associated with the object. In some examples, the estimated positions may be determined based on an assumption of substantially constant velocity and/or substantially constant trajectory (e.g., little to no lateral movement of the object). In some examples, the estimated positions (and/or potential trajectories) may be based on passive and/or prediction. In some examples, the model component 432 may utilize physics and/or geometry based techniques, machine learning, linear temporal logic, tree search methods, heat maps, and/or other techniques for determining predicted trajectories and/or estimated positions of objects.

In various examples, the estimated states may be generated periodically throughout the time period. For example, the model component 432 may generate estimated states at 0.1 second intervals throughout the time period. For another example, the model component 432 may generate estimated states at 0.05 second intervals. The estimated states may be used by the planning component 426 in determining an action (e.g., the trajectory 120(1), the trajectory 120(2), the trajectory 120(3), and the trajectory 120(4)) for the vehicle 402 to follow in an environment.

In various examples, the model component 432 may utilize machine learned techniques to predict risks associated with evaluated trajectories. In such examples, the machine learned algorithms may be trained to determine, based on sensor data and/or previous predictions by the model, that an object is likely to behave in a particular way relative to the vehicle 402 at a particular time during a set of estimated states (e.g., time period). In such examples, one or more of the vehicle 402 state (position, velocity, acceleration, trajectory, etc.) and/or the object state, classification, etc. may be input into such a machine learned model and, in turn, a behavior prediction may be output by the model.

In various examples, characteristics associated with each object type may be used by the model component 432 to determine an object velocity or acceleration usable to predict potential intersection(s) between objects and/or between the vehicle 402 and one or more objects. Examples of characteristics of an object type may include, but not be limited to: a maximum longitudinal acceleration, a maximum lateral acceleration, a maximum vertical acceleration, a maximum speed, maximum change in direction for a given speed, and the like.

As can be understood, the components discussed herein (e.g., the localization component 420, the perception component 422, the prediction component 424, the planning component 426, the one or more system controllers 428, the one or more maps 430, the model component 432 including the model(s) 434 are described as divided for illustrative purposes. However, the operations performed by the various components may be combined or performed in any other component.

While examples are given in which the techniques described herein are implemented by a planning component and/or a model component of the vehicle, in some examples, some or all of the techniques described herein could be implemented by another system of the vehicle, such as a secondary safety system. Generally, such an architecture can include a first computing device to control the vehicle 402 and a secondary safety system that operates on the vehicle 402 to validate operation of the primary system and to control the vehicle 402 to avoid collisions.

In some instances, aspects of some or all of the components discussed herein may include any models, techniques, and/or machine learned techniques. For example, in some instances, the components in the memory 418 (and the memory 440, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally, or in the alternative, the sensor system(s) 406 may send sensor data, via the one or more networks 442, to the one or more computing device(s) 436 at a particular frequency, after a lapse of a predetermined period of time, in near real-time, etc.

The vehicle 402 may also include one or more emitters 408 for emitting light and/or sound. The emitter(s) 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., remote computing device 436, other nearby vehicles, etc.) and/or one or more remote sensor system(s) 444 for receiving sensor data. The communications connection(s) 410 also enable the vehicle 402 to communicate with a remote teleoperations computing device or other remote services.

The communications connection(s) 410 may include physical and/or logical interfaces for connecting the vehicle computing device 404 to another computing device or a network, such as network(s) 442. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive module with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the prediction component 424, the planning component 426, the one or more system controllers 428, the one or more maps 430, and the model component 432, may process sensor data, as described above, and may send their respective outputs, over the one or more network(s) 442, to the computing device(s) 436. In at least one example, the localization component 420, the perception component 422, the prediction component 424, the planning component 426, the one or more system controllers 428, the one or more maps 430, and the model component 432 may send their respective outputs to the remote computing device(s) 436 at a particular frequency, after a lapse of a predetermined period of time, in near real-time, etc.

In some examples, the vehicle 402 may send sensor data to the computing device(s) 436 via the network(s) 442. In some examples, the vehicle 402 may receive sensor data from the computing device(s) 436 and/or remote sensor system(s) 444 via the network(s) 442. The sensor data may include raw sensor data and/or processed sensor data and/or representations of sensor data. In some examples, the sensor data (raw or processed) may be sent and/or received as one or more log files.

The computing device(s) 436 may include processor(s) 438 and a memory 440 storing the map component 446, a sensor data processing component 448, and a training component 450. In some examples, the map component 446 may include functionality to generate maps of various resolutions. In such examples, the map component 446 may send one or more maps to the vehicle computing device 404 for navigational purposes. In various examples, the sensor data processing component 448 may be configured to receive data from one or more remote sensors, such as sensor system(s) 406 and/or remote sensor system(s) 444. In some examples, the sensor data processing component 448 may be configured to process the data and send processed sensor data to the vehicle computing device 404, such as for use by the model component 432 (e.g., the model(s) 434). In some examples, the sensor data processing component 448 may be configured to send raw sensor data to the vehicle computing device 404.

In some instances, the training component 450 can include functionality to train a machine learning model to output evaluate trajectories. For example, the training component 450 can receive sensor data that represents an object traversing through an environment for a period of time, such as 0.1 milliseconds, 1 second, 3, seconds, 5 seconds, 7 seconds, and the like. At least a portion of the sensor data can be used as an input to train the machine learning model.

In some instances, the training component 450 may be executed by the processor(s) 438 to train the a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with evaluated trajectories and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 450 can include functionality to train a machine learning model to output classification values. For example, the training component 450 can receive data that represents labelled collision data (e.g. publicly available data, sensor data, and/or a combination thereof). At least a portion of the data can be used as an input to train the machine learning model. Thus, by providing data where the vehicle traverses an environment, the training component 450 can be trained to output potential intersection(s) associated with objects, as discussed herein.

In some examples, the training component 450 can include training data that has been generated by a simulator. For example, simulated training data can represent examples where a vehicle collides with an object in an environment or nearly collides with an object in an environment, to provide additional training examples.

The processor(s) 416 of the vehicle 402 and the processor(s) 438 of the computing device(s) 436 may be any suitable processor capable of executing instructions to process data and perform operations as described herein. By way of example and not limitation, the processor(s) 416 and 438 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and memory 440 are examples of non-transitory computer-readable media. The memory 418 and memory 440 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa.

Figure 5:
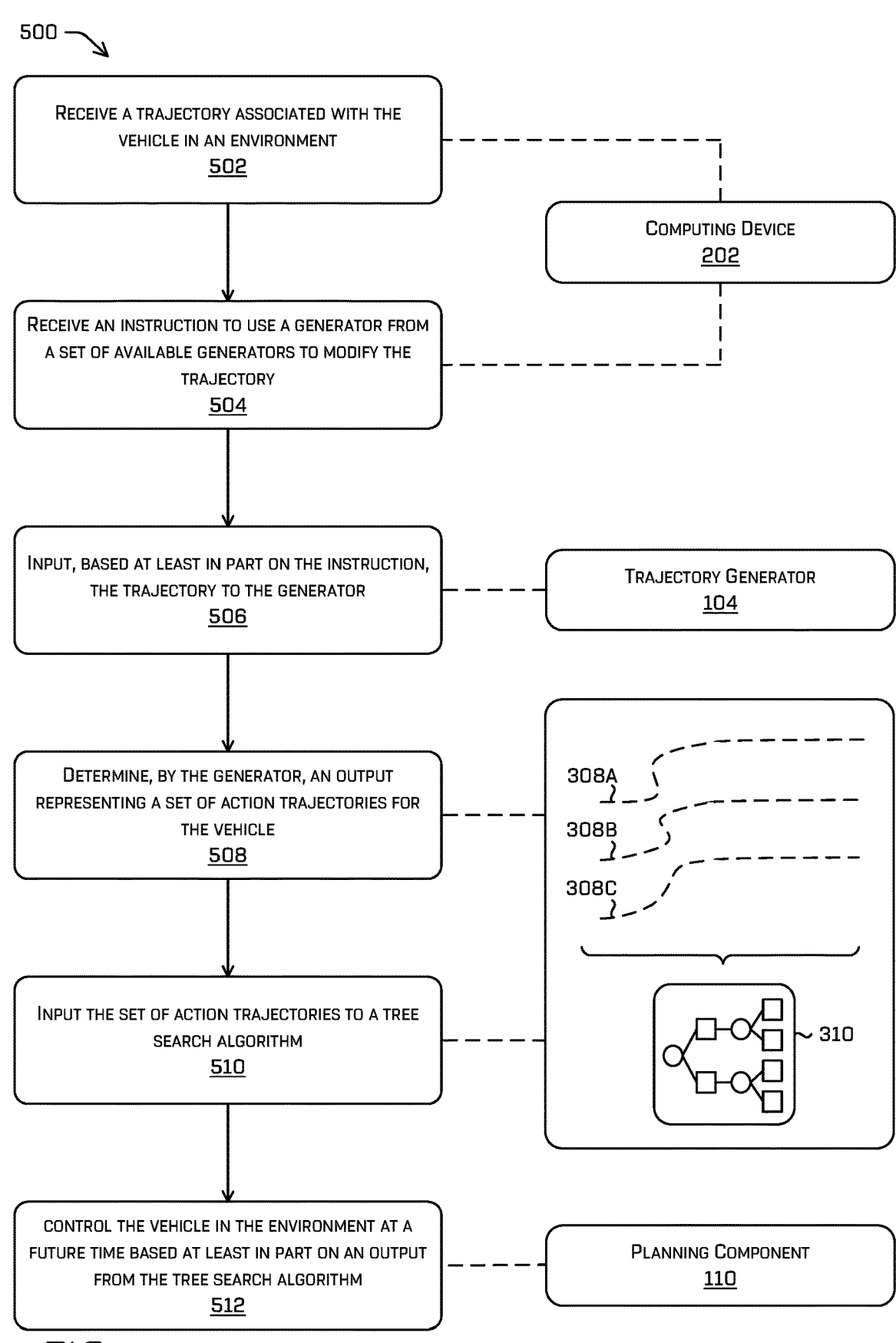
FIG. 5 is a flowchart depicting an example process for determining action trajectories for associating with a tree structure using one or more example components.

FIG. 5 is a flowchart depicting an example process for determining action trajectories for associating with a tree structure using one or more example components. For example, some or all of the process 500 can be performed by one or more components in FIG. 4, as described herein. For example, some or all of the process 500 can be performed by the vehicle computing device 404 or the computing device 202.

At operation 502, the process may include receiving a trajectory associated with a vehicle in an environment, the trajectory including a direction, a velocity, and an acceleration. In some examples, the operation 502 may include a computing device receiving one or more baseline trajectories as input data. In some examples, the trajectory (e.g., the baseline trajectory (ies)) may be determined by the prediction component 424, or some other component, for example. In some examples, a storage device (e.g., memory, database, and the like) can store profile data identifying information about multiple baseline trajectories, and provide one or more baseline trajectories to the trajectory generator 104 as input. For instance, the profile data can include profiles for different baseline trajectories, and a profile can include one or more of: a baseline trajectory identifier (e.g., a value uniquely identifying each baseline trajectory in the storage device), information about which generators to implement with a particular baseline trajectory, a control policy, or a human-readable description for each baseline trajectory.

At operation 504, the process may include receiving an instruction to use a generator from as set of available generators to modify the trajectory. In some examples, the operation 504 may include the trajectory generator 104 implementing the transform component 204, the resample component 206, and/or the extrapolate component 208 (or different model) that is configured to modify the trajectory in a variety of ways as described herein. In various examples, the computing device 202 can generate the instruction for sending to the trajectory generator 104 based at least in part on identifying the generator(s) to implement with a particular baseline trajectory as indicated by the profile data.

At operation 506, the process may include inputting, based at least in part on the instruction, the trajectory to the generator. In some examples, the operation 506 may include the trajectory generator 104 receiving the one or more baseline trajectories as input, identifying which generators to execute based on information associated with the instruction, and inputting the trajectory into the identified generator.

At operation 508, the process may include determining, by the generator, an output representing a set of action trajectories for the vehicle. In some examples, the operation 508 may include the trajectory generator 104 implementing one or more components or models to modify (e.g., transform, resample, extrapolate, add static awareness, add a stopping trajectory, etc.) a single trajectory to generate multiple action trajectories, such as the action trajectories 218 and 222, and the action trajectories 308, just to name a few. In various examples, the set of action trajectories for the vehicle may include a single modified trajectory, or multiple trajectories, depending on whether or not the generator implemented produces a single output or multiple outputs. In examples when multiple generators are implemented, the set of action trajectories can represent a final output from the last component implemented.

The operation 508 may include, in some examples, the computing device 202 implementing the memory allocation component to allocate data for input to a parallel processing unit such as the input trajectory and other data usable for determining the set of action trajectories, as discussed herein. In various examples, the set of action trajectories can represent a change in time and/or space from the input trajectory.

At operation 510, the process may include inputting the set of action trajectories to a tree search algorithm. In some examples, the operation 510 may include the trajectory generator 104 (or another component) assigning each action trajectory in of the set of action trajectories to a portion of a tree structure that is searchable using the tree search algorithm.

At operation 512, the process may include controlling the vehicle in the environment at a future time based at least in part on an output from the tree search algorithm. In some examples, the operation 512 may include the trajectory generator 104 transmitting data associated with the set of action trajectories to the planning component 110, the planning component 426, or other component usable for planning operations. For example, the vehicle computing device can implement a model to generate a vehicle trajectory to control the vehicle in an environment based at least in part on the set of action trajectories. In some examples, the planning component 426 may process information associated with the set of action trajectories to determine a candidate trajectory, or other action for the vehicle, to avoid the potential intersections with the objects. In some examples, the vehicle computing device 404 can control steering, braking, acceleration, and so on, of the vehicle in an environment in the future based at least on the information from the trajectory generator 104.

In various examples, process 500 may return to 502 after performing operation 512. In such examples, the vehicle may continuously monitor for potential collisions and update/modify decisions regarding whether to engage a safety system or not (which may, in at least some examples, include performing one or more maneuvers to mitigate or minimize an impact). In any of the examples described herein, the process may repeat with a given frequency and generate one or more occupancy grids associated with one or more multiple times in the future for making the determinations above.

FIG. 5 illustrates an example process in accordance with examples of the disclosure. These process is illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted and/or combined in any order and/or in parallel to implement the processes. For instance, the example process may omit operation 512 and instead verify operation of a vehicle controller.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving a baseline trajectory associated with a vehicle in an environment, the baseline trajectory including a direction, a velocity, and an acceleration: inputting the baseline trajectory into a first generator to modify a lateral distance associated with one or more points along the baseline trajectory: inputting the baseline trajectory into a second generator to modify a velocity associated with the one or more points along the baseline trajectory: determining, based at least in part on a first output from the first generator and a second output from the second generator, a set of action trajectories associated with the vehicle: defining a tree structure based at least in part on the set of action trajectories: determining, based at least in part on the tree structure, a candidate trajectory; and controlling the vehicle based at least in part on the candidate trajectory.

B: The system of paragraph A, the operations further comprising: modifying, based at least in part on a control policy, a shape of at least one action trajectory in the set of action trajectories to output a modified set of action trajectories, wherein the tree structure is further defined based at least in part on the modified set of action trajectories.

C: The system of paragraph A or B, the operations further comprising: inputting the baseline trajectory to a third generator: determining, by the third generator, presence of a static object in the environment; and receiving, as third output from the third generator, an action trajectory in the set of action trajectories to avoid the static object.

D: The system of any of paragraphs A-C, wherein an action trajectory in the set of action trajectories is defined by multiple points, and the operations further comprising: inputting the action trajectory into a third generator configured to one or more of: relocating one of the multiple points along an action trajectory from a first location to a second location along the action trajectory, modifying a vehicle state associated with one of the multiple points of the action trajectory, modifying a number of the multiple points of the action trajectory, increasing a length of the action trajectory, or determining a stopping action associated with the action trajectory; and receiving an output from the third generator, wherein the set of action trajectories comprises the output.

E: The system of any of paragraphs A-D, wherein an output from the first generator is an input to the second generator.

F: One or more non-transitory computer-readable media storing instructions executable by one or more processors, wherein the instructions, when executed, cause the one or more processors to perform operations comprising: receiving a trajectory associated with a vehicle: inputting the trajectory into a component: receiving, from the component, a set of action trajectories: inputting the set of action trajectories and the trajectory into a tree search algorithm: receiving, as an output of the tree search algorithm, a candidate trajectory; and controlling the vehicle based at least in part on the candidate trajectory.

G: The one or more non-transitory computer-readable media of paragraph F, wherein the component determines a first trajectory of the set of action trajectories based at least in part on modifying, based at least in part on a control policy, a shape of at least the trajectory.

H: The one or more non-transitory computer-readable media of paragraph F or G, wherein the component is a first component, and the operations further comprises: inputting the trajectory to a second component: determining, by the second component, presence of a static object in an environment; and receiving, from the second component, a second trajectory of the set of action trajectories configured to control the vehicle to avoid the static object.

I: The one or more non-transitory computer-readable media of any of paragraphs F-H, wherein the component is a first component, and the operations further comprising: inputting the set of action trajectories to a second component: performing, by the second component, one or more of: relocating one of multiple points along an action trajectory from a first location to a second location between a first end and a second end of the action trajectory: modifying a number of the multiple points of the action trajectory: extending at least one of the multiple points from the second end of the action trajectory to a position in an environment: or determining a stopping action associated with the action trajectory; and receiving an output from the second component, wherein the set of action trajectories is determined based at least in part on the output from the second component.

J: The one or more non-transitory computer-readable media of any of paragraphs F-I, wherein an output from the component is an input to another component.

K: The one or more non-transitory computer-readable media of any of paragraphs F-J, wherein inputting the set of action trajectories into the tree search algorithm comprises: defining a tree structure to include a branch for each action trajectory in the set of action trajectories; and controlling the vehicle is further based at least in part on an output of the tree structure.

L: The one or more non-transitory computer-readable media of any of paragraphs F-K, wherein: determining the set of action trajectories comprises the component performing a first transformation using a first model and a second transformation using a second model different form the first model.

M: The one or more non-transitory computer-readable media of any of paragraphs F-L, further comprising: transmitting the set of actions trajectories associated with the tree search algorithm to a vehicle computing device: determining, based at least in part on a search of a tree structure, a candidate trajectory for the vehicle to use at a future time; and controlling the vehicle in an environment using the candidate trajectory.

N: The one or more non-transitory computer-readable media of any of paragraphs F-M, the operations further comprising: determining an identifier associated with the trajectory: determining information describing a data structure of the trajectory; and storing the identifier and the information as profile data in a storage device.

O: The one or more non-transitory computer-readable media of any of paragraphs F-N, the operations further comprising: determining metadata describing an action trajectory in the set of action trajectories, the metadata including a source of the action trajectory and information of a segment of the action trajectory; and associating the metadata with the tree search algorithm.

P: The one or more non-transitory computer-readable media of any of paragraphs F-O, the operations further comprising: determining the set of action trajectories based at least in part on an output by a parallel processing unit.

Q: A method comprising: receiving a trajectory associated with a vehicle; inputting the trajectory into a component: receiving, from the component, a set of action trajectories: inputting the set of action trajectories and the trajectory into a tree search algorithm: receiving, as an output of the tree search algorithm, a candidate trajectory; and controlling the vehicle based at least in part on the candidate trajectory.

R: The method of paragraph Q, wherein the component determines a first trajectory of the set of action trajectories based at least in part on modifying, based at least in part on a control policy, a shape of at least the trajectory.

S: The method of paragraph Q or R, wherein the component is a first component, and further comprising: inputting the trajectory to a second component: determining, by the second component, presence of a static object in an environment; and receiving, from the second component, a second trajectory of the set of action trajectories configured to control the vehicle to avoid the static object.

T: The method of any of paragraphs Q-S, wherein an output from the component is an input to another component.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:

receiving a baseline trajectory associated with a vehicle in an environment, the baseline trajectory including a direction, a velocity, and an acceleration;

inputting the baseline trajectory into a generator to modify one or more points along the baseline trajectory;

determining, based at least in part on an output from the generator, a set of action trajectories associated with the vehicle;

defining a portion of branches of a tree structure based at least in part on the set of action trajectories, the tree structure comprising a same start point for the set of action trajectories;

determining, based at least in part on the portion of branches of the tree structure, a candidate trajectory; and controlling the vehicle based at least in part on the candidate trajectory.

2. The system of claim 1, the operations further comprising:

modifying, based at least in part on a control policy, a shape of at least one action trajectory in the set of action trajectories to output a modified set of action trajectories, wherein the tree structure is further defined based at least in part on the modified set of action trajectories.

3. The system of claim 1, wherein the output is a first output, and the operations further comprising:

determining, by the generator, presence of a static object in the environment; and receiving, as a second output from the generator, an action trajectory in the set of action trajectories to avoid the static object.

4. The system of claim 1, wherein an action trajectory in the set of action trajectories is defined by multiple points, the generator is a first generator, the output is a first output, and the operations further comprising:

inputting the action trajectory into a second generator configured to one or more of:

relocating one of the multiple points along the action trajectory from a first location to a second location along the action trajectory, modifying a vehicle state associated with one of the multiple points of the action trajectory, modifying a number of the multiple points of the action trajectory, increasing a length of the action trajectory, or determining a stopping action associated with the action trajectory; and receiving a second output from the second generator, wherein the set of action trajectories comprises the second output.

5. The system of claim 1, wherein at least one of the set of action trajectories defines a node of the tree structure.

6. One or more non-transitory computer readable media storing instructions executable by one or more processors, wherein the instructions, when executed, cause the one or more processors to perform operations comprising:

receiving a trajectory associated with a vehicle;

inputting the trajectory into a component;

receiving, from the component, a set of action trajectories comprising a first action trajectory that includes a first modification of the trajectory and a second action trajectory that includes a second modification of the trajectory;

inputting the set of action trajectories and the trajectory into a tree search algorithm that searches the first action trajectory, the second action trajectory, and the trajectory in a tree structure, wherein the first action trajectory and the second action trajectory start at a same root node of the tree structure;

receiving, as an output of the tree search algorithm, a candidate trajectory; and controlling the vehicle based at least in part on the candidate trajectory.

7. The one or more non-transitory computer readable media of claim 6, wherein the component determines a first trajectory of the set of action trajectories based at least in part on modifying, based at least in part on a control policy, a shape of at least the trajectory.

8. The one or more non-transitory computer readable media of claim 6, wherein the component is a first component, and the operations further comprise:

inputting the trajectory to a second component;

determining, by the second component, presence of a static object in an environment; and receiving, from the second component, a second trajectory of the set of action trajectories configured to control the vehicle to avoid the static object.

9. The one or more non-transitory computer readable media of claim 6, wherein the component is a first component, the output is a first output, and the operations further comprising:

inputting the set of action trajectories to a second component;

performing, by the second component, one or more of:

relocating one of multiple points along an action trajectory from a first location to a second location between a first end and a second end of the action trajectory, modifying a number of the multiple points of the action trajectory, extending at least one of the multiple points from the second end of the action trajectory to a position in an environment, or determining a stopping action associated with the action trajectory; and receiving a second output from the second component, wherein the set of action trajectories is determined based at least in part on the second output from the second component.

10. The one or more non-transitory computer readable media of claim 6, wherein the output is a first output and a second output from the component is an input to another component.

11. The one or more non-transitory computer readable media of claim 6, wherein inputting the set of action trajectories into the tree search algorithm comprises:

defining the tree structure to include a branch for at least one action trajectory in the set of action trajectories.

12. The one or more non-transitory computer readable media of claim 6, wherein:

determining the set of action trajectories comprises the component performing a first transformation using a first model and a second transformation using a second model different from the first model.

13. The one or more non-transitory computer readable media of claim 6, the operations further comprising:

transmitting the set of action trajectories associated with the tree search algorithm to a vehicle computing device;

determining, based at least in part on a search of the tree structure, the candidate trajectory for the vehicle to use at a future time; and controlling the vehicle in an environment using the candidate trajectory.

14. The one or more non-transitory computer readable media of claim 6, the operations further comprising:

determining an identifier associated with the trajectory;

determining information describing a data structure of the trajectory; and storing the identifier and the information as profile data in a storage device.

15. The one or more non-transitory computer readable media of claim 6, the operations further comprising:

determining metadata describing an action trajectory in the set of action trajectories, the metadata including a source of the action trajectory and information of a segment of the action trajectory; and associating the metadata with the tree search algorithm.

16. The one or more non-transitory computer readable media of claim 6, where the output is a first output and the operations further comprising:

determining the set of action trajectories based at least in part on a second output by a parallel processing unit.

17. A method comprising:

receiving a trajectory associated with a vehicle;

inputting the trajectory into a component;

receiving, from the component, a set of action trajectories comprising a first action trajectory that includes a first modification of the trajectory and a second action trajectory that includes a second modification of the trajectory;

inputting the set of action trajectories and the trajectory into a tree search algorithm that searches the first action trajectory, the second action trajectory, and the trajectory in a tree structure, wherein the first action trajectory and the second action trajectory comprise a same start point in the tree structure;

receiving, as an output of the tree search algorithm, a candidate trajectory; and controlling the vehicle based at least in part on the candidate trajectory.

18. The method of claim 17, wherein the component determines the first action trajectory of the set of action trajectories based at least in part on modifying, based at least in part on a control policy, a shape of at least the trajectory.

19. The method of claim 17, wherein the component is a first component, and further comprising:

inputting the trajectory to a second component;

determining, by the second component, presence of a static object in an environment; and receiving, from the second component, a second trajectory of the set of action trajectories configured to control the vehicle to avoid the static object.

20. The method of claim 17, wherein the output is a first output and a second output from the component is an input to another component.

* * * * *